(12) United States Patent
Ippolito (10) Patent No.: US 8,539,746 B2
(45) Date of Patent: Sep. 24, 2013

(54) TETHER FOR TROPOSPHERIC AEOLIAN GENERATOR

(75) Inventor: Massimo Ippolito, Berzano di San Pietro (IT)

(73) Assignee: Kite Gen Research S.R.L., Chieri (IT)

( * ) Notice: Subject to any disclaimer, the term of this patent is extended or adjusted under 35 U.S.C. 154(b) by 81 days.

(21) Appl. No.: 13/138,234

(22) PCT Filed: Jan. 20, 2010

(86) PCT No.: PCT/IT2010/000015
§ 371 (c)(1),
(2), (4) Date: Oct. 24, 2011

(87) PCT Pub. No.: WO2010/084520
PCT Pub. Date: Jul. 29, 2010

(65) Prior Publication Data
US 2012/0036821 A1    Feb. 16, 2012

(30) Foreign Application Priority Data

Jan. 23, 2009    (IT) .............................. TO2009U0008

(51) Int. Cl.
*D02G 3/44* (2006.01)
(52) U.S. Cl.
USPC .............................................. 57/200; 57/236
(58) Field of Classification Search
USPC ................... 57/200, 236; 244/153 A, 153 R, 244/155 R; 290/44, 55
See application file for complete search history.

(56) References Cited

U.S. PATENT DOCUMENTS

| | | | |
|---|---|---|---|
| 3,859,949 A | 1/1975 | Toussaint | |
| 4,024,409 A * | 5/1977 | Payne | 290/55 |
| 4,084,065 A | 4/1978 | Swenson | |
| 4,084,102 A * | 4/1978 | Fry et al. | 290/55 |
| 4,365,574 A | 12/1982 | Norminton | |
| 4,836,122 A | 6/1989 | Henderson et al. | |
| 5,067,384 A | 11/1991 | Scala | |
| 6,179,524 B1 | 1/2001 | Allen | |
| 6,223,672 B1 | 5/2001 | Allen et al. | |
| 6,254,034 B1 * | 7/2001 | Carpenter | 244/153 R |
| 6,523,781 B2 * | 2/2003 | Ragner | 244/153 R |
| 6,532,700 B1 * | 3/2003 | Maliszewski et al. | 52/40 |
| 2002/0040948 A1 * | 4/2002 | Ragner | 244/153 R |
| 2002/0192068 A1 * | 12/2002 | Selsam | 415/3.1 |
| 2003/0066934 A1 * | 4/2003 | Bolonkin | 244/153 R |
| 2005/0046197 A1 * | 3/2005 | Kingsley | 290/55 |
| 2008/0185480 A1 * | 8/2008 | Vergnano | 244/153 A |
| 2008/0210826 A1 | 9/2008 | Ockels | |
| 2009/0289148 A1 * | 11/2009 | Griffith et al. | 244/155 R |

(Continued)

FOREIGN PATENT DOCUMENTS

| | | |
|---|---|---|
| CA | 887428 | 12/1971 |
| DE | 26 26 659 | 12/1977 |

(Continued)

*Primary Examiner* — Shaun R Hurley
(74) *Attorney, Agent, or Firm* — Law Offices John A. Parrish (57) ABSTRACT

A rope (3) is described for a tropospheric aeolian generator (1) composed, in length, of at least one first sector (4) adapted to resist to repeated flexure cycles, having a safety coefficient (S1), a diameter D(b1) and an aerodynamic resistance coefficient (CD1); at least one second sector (5) adapted to resist to repeated traction cycles with great load, having a safety coefficient S2<S1 and a diameter D(b2)<D(b1).

24 Claims, 7 Drawing Sheets (56) References Cited

U.S. PATENT DOCUMENTS

2010/0270432 A1* 10/2010 Mueller .................. 244/153 A
2011/0074161 A1   3/2011 Ippolito
2011/0266809 A1* 11/2011 Calverley ..................... 290/55

FOREIGN PATENT DOCUMENTS

| EP | 1672214 | 6/2006 |
|----|---------|--------|
| FR | 2 573 446 | 1/1987 |
| WO | WO2004035986 | 4/2004 |
| WO | WO2005019525 | 3/2005 |
| WO | WO2005116459 | 12/2005 |
| WO | WO2006086338 | 8/2006 |
| WO | WO2006101723 | 9/2006 |
| WO | WO2006133881 | 12/2006 |
| WO | WO2006134381 | 12/2006 |
| WO | WO2007129341 | 11/2007 |
| WO | WO2007133724 | 11/2007 |
| WO | WO2009142762 | 11/2009 |
| WO | WO2009147692 | 12/2009 |

* cited by examiner

TETHER FOR TROPOSPHERIC AEOLIAN GENERATOR

TECHNICAL FIELD

The present invention refers to a rope for a tropospheric aeolian generator.

BACKGROUND

A new category of tropospheric aeolian generators is known in the art, currently being developed by different search groups, that share the common objective of exploiting the great amount of aeolian energy at high altitudes through kites, wings, aircrafts, aerostats and airships constrained to the ground through long ropes with high mechanical resistance.

The common operating principle of the tropospheric aeolian generators is based on keeping flying aerodynamic bodies that are able to convert wind energy at high altitudes into mechanical energy capable of performing works and, afterwards, on converting mechanical energy into electric energy that can be used for civil and industrial purposes in general.

In its simplest, most efficient and safe configuration, the aerodynamic body can simply be a wing with high aerodynamic efficiency, kept flying at heights that cannot be reached by current aerogenerators and constrained to the ground through high-resistance ropes.

Alternatively, the aerodynamic body can be much more complex, for example an aeolian turbine rotor kept flying due to an airship, or an aircraft equipped with tail planes and stabilising members.

In particular, all generators in this category are equipped with at least one constraining rope that is periodically wound and unwound through a winch or a system of winches.

Not only generators that exploit the winch rotation to convert mechanical energy into electric energy, but also generators in which the rope winding and unwinding is used only for checking the flight height and the trajectory or, still more simply, only for takeoff and landing phases, can find advantages in the present invention.

Also naval traction systems or electric generation systems aboard of ships and vessels based on kites can find advantages in the present invention.

Examples of such aeolian generators are disclosed in Italian patents n. 0001344401 and 0001344926 in the name of Ippolito Massimo, that describe the general concept on which a tropospheric aeolian generator is based, in European patent n. EP1672214 in the name of Ippolito Massimo, that describes the carousel-type configuration, in PCT Patent Application n. PCT WO2007/129341 in the name of Kite Gen Research S.r.l., that describes the control system, and in Italian Patent Application n. TO2008A000423, that describes the generator infrastructure in its configuration called "yo-yo".

In particular, energy that can be extracted through known generators mentioned above depends firstly on atmospheric phenomena, such as wind speed and direction, that can be evaluated upon designing, but cannot be affected by the designer. Energy that can be extracted however also depends on accurate design choices that can be controlled, such as surface and aerodynamic characteristics of the sails.

All evaluations performed by the Applicant on energy that can be extracted through known generators mentioned above have confirmed that, among the parameters that remain at the designer's discretion, the aerodynamic efficiency of the global system composed of wing and ropes is the most important element: in fact, the aerodynamic efficiency appears raised to a power of two in formulas that describe and foresee the energy that can be collected, while the sail surface appears linearly. The sail efficiency, represented by the ratio between lift coefficient and resistance coefficient, is generally high, due to the sail' aerodynamic section that brings about a low value of the aerodynamic resistance coefficient.

In order to improve safety and reliability of generators disclosed by the Applicant, the adoption of a pair of ropes has been chosen, instead of using a single rope as preferred by others, such as disclosed, for example, in U.S. Patent Application 2008/0210826 of Ockels et al. In fact, the pair of ropes allows first of all to control the wind trajectory without the need of installing electro-mechanical components on board, and protects the manoeuvre capacity from malfunctions, failures, communication difficulties of possible components installed on board the kite, in addition to the uncontrolled fall and loss of the wing in case of breakage of the single rope.

The pair of ropes further transform the rare event represented by the breakage of a rope, for example due to a manufacturing defect, from a potentially dangerous event into a simple recovery and maintenance procedure: the breakage of one of the two ropes in fact implies the instantaneous decrease of wing lift, with following reduction of the stress acting on the remaining rope. In this way, it is always possible to bring back the wing to the ground, by quickly rewinding the remaining rope, due to the behaviour of the wing that can be assimilated to a parachute.

The same principle is also adopted and advantageously exploited under operating conditions during the rope re-winding step that follows the winding and energy generating step: in fact, by releasing in a controlled way one of the ropes and by keeping tension on the second rope, the wing is naturally taken to a position for which the resultant of aerodynamic forces is composed almost exclusively by the resistance, while the lift becomes neglectable. By keeping the wing in this particular attitude, that could be defined as "side-slip" manoeuvre, as analogy with what is performed under emergency situations or during a fight by aircraft pilots, it is possible to high-speed re-wind the control ropes with a minimum energy cost.

The use of two ropes therefore implies an increase of the global resistance with respect to the solution with a single rope, but provides undoubted advantages in terms of safety and reliability.

The commercially available ropes are however not conceived, and consequently optimised, to be used by a tropospheric aeolian generator and are a severely limiting factor of global aerodynamic performances.

As known, the behaviour of ropes in simulations can be ascribed, as first approximation, to the behaviour of a smooth cylinder with infinite length crossed by a current orthogonal to the cylinder axis, estimating a resistance coefficient typically equal to $C_D=1,2$ depending on experimental data in the wind gallery related to the number of Reynolds typical of many practical applications. This approach, that does not take into account real cable shape, surface roughness, longitudinal and torsion elasticity, implies the under-estimation, in general, of the real entity of the resistance coefficient.

For example, a rope with many strands can have a still greater resistance coefficient, equal to $C_D=1,5$ when immersed in a uniform fluid. In case of long cables, when the phenomenon of vibration induced by vortexes (VIV) is triggered, the resistance coefficient can even reach values on the order of $C_D=2.5-3$, as well as forces can appear that are orthogonal to the current to which a lift coefficient $C_L$ corresponds. The problem is particularly sensible in many application fields, in particular in the naval and offshore fields, where particularly long ropes and cables are subjected to the action of currents with varying intensity, for example the tie-rods of oil platforms, or cables that tow remote-controlled submarine vehicles (ROV).

There are obviously also many examples in the civil field, where suspended lines for transmitting electric energy, or tie-rods of suspended bridges, can be affected by potentially dangerous oscillations. In these applications, solutions are first of all searched that are able to reduce the oscillation amplitude and make it unlikely that instabilities of the elastic balance occur, and efficiency is required independently from the direction of the incident fluid.

In other applications above all a reduction of the cable fluid-dynamic resistance is searched.

Among the many proposed methods, it is possible to remember the roughness distributions according to repeated schemes, the distribution of surface bumps or recesses, the helical windings, the addition of bands of fabric, more or less aerodynamic rigid or flexible fairings.

However, when the cable is subjected to repeated winding and unwinding cycles on a winch drum, as occurs in aeolian generators of the previously described types, the complexity of the technical problem increases and the choice of available solutions is reduced.

Also in aeronautics, the problem is particularly relevant, since already at the time of biplanes, in England profiled structural members were developed, called "RAF wires", as replacement of tie-rods made of steel cables or full red iron. The importance of such phenomenon can be evaluated starting from considerations about dimensioning a typical tropospheric generator. An aircraft wing can generate a lift on the order of 10 kN/m².

For example, a fully loaded Boeing 747-400 upon takeoff has a ratio between weight and wing surface equal to W/S=7500 N/m². Since this is an aircraft for transporting passengers, in which accelerations must be limited (load factor n=2.5), it can be deduced that the wing structure is sized to tolerate, under safety conditions, a specific lift equal to 18750 N/m².

A reference value for the ratio between weight and wing surface of an aircraft without engine, such as for example gliders, hang gliders, crazy fly crafts and kites can be on the order of W/S=300 N/m².

These aircrafts, in spite of the structure of their wings, weighs about 50 N/m², however they can perform manoeuvres with a high number of g (load factor n=6 for the acrobatic category), and therefore can develop and tolerate specific lift values on the order of 1800 N/m².

Assuming for the kite of the generator devised by the Applicant and described in the above patents, a lift coefficient $C_L=1$, a density value $\rho=1.225$ kg/m³, a wing surface S=100 m², a flight speed V=40 m/s, the classical lift formula returns the value of 98000 N, therefore a value near 1000 N/m².

Assuming for example F=100 kN as value of the force generated by the kite that has to be transmitted to the generator through the ropes, it is clear that these latter ones must be suitably sized.

Examining the tables of the best manufacturers of synthetic ropes, assuming to use a single rope (solution A) optimised for repeated flexure cycles and adopting a safety coefficient S=3, a single rope would be necessary whose diameter is D(a)=18 mm with ultimate tensile stress of 304 kN.

Assuming instead to use a pair of ropes (solution B), due to the reliability and safety reasons that have been stated before, two ropes would be necessary, having a diameter D(b)=14 mm and ultimate tensile stress of 168.6 kN for a whole 337 kN. In fact, assuming very approximately, but with a typical behaviour, that the rope moves with null speed with respect to air next to the ground generator and with a speed equal to the kite speed next to the kite itself, with a linear speed variation along the rope, it is possible to estimate the global rope resistance.

By adopting an aerodynamic resistance coefficient $C_D=1.2$ and a flight speed equal to V=40 m/s, a single rope with diameter D(a)=18 mm and length 1000 m completely unwound generates a global resistance next to 7054 N. Under the same conditions, a rope with diameter D(b)=14 mm generates a global resistance next to 5487 N, therefore taking into account a pair of ropes having diameter D(b)=14 mm, the global resistance is next to 10974 N.

It is clear that, from the point of view of the aerodynamic resistance, both above solutions A and B would anyway be problematic, with a disadvantage for the solution with two ropes (solution B) that is anyway amply justified by the increase of safety and reliability.

In view of the above, the art has proposed several solutions suitable to improve the cyclic fatigue resistance of ropes subjected to repeated flexure around pulleys and winches.

For example, PCT Patent Application WO2004/035896 to Knudsen R. B and Sloan F. E. discloses a rope built using a mixture of filaments of a different nature, in this case HMPE and LCP, according to a particular proportion.

PCT Patent Application WO2005/019525 to Frazer et al. discloses a rope with a core without structural function that fills the empty space between strands required to support the loads.

Similarly, PCT Patent Application PCT WO2006/086338 to Bucher et al. innovates by introducing fibres with low friction coefficient, in particular fluoro-polymeric fibres, to compose the rope strands.

A similar solution is described in PCT Patent Application WO2006/101723 to Nye, in which a filament of fluoro-carbon polymer is used.

PCT Patent Application WO2006/133881 to Bosman R. instead discloses a rope in which the transverse section is oblong, having a fineness ratio included between 1.2 and 4.0, as well as a pulley with groove adapted to the rope section.

In all cases, the purpose is increasing the number of useful life cycles of the rope without excessively increasing the rope diameter and weight, at the same time keeping the chance of performing a visual inspection that points out the wear status and possible localised damages.

Several solutions have also been proposed to reduce the fluid-dynamic wear of ropes that relatively move with respect to a fluid, almost all for applications in the naval and oceanographic fields, therefore with needs and adopted solutions that are very different from those suitable for a tropospheric aeolian generator.

For example the following can be cited: patent CA887428 to Pearce et al, U.S. Pat. No. 3,859,949 to Toussaint and Meyer, U.S. Pat. No. 4,365,574 to Norminton, U.S. Pat. No. 4,836,122 to Henderson and Wingham, U.S. Pat. No. 6,179,524 to Allen et al, PCT Patent Application WO2005/116459 to Allen et al., PCT Patent Application WO2006/134381 to Pearce, U.S. Pat. No. 6,179,524 to McMillan, U.S. Pat. No. 6,223,672 to Allen et al. as example of covers, fairings, profiles suitable to suppress the vibrations induced by vortexes and reduce the aerodynamic resistance of cylindrical bodies immersed in a sea environment.

Interesting examples are then U.S. Pat. No. 4,084,065 to Swenson and the more recent U.S. Pat. No. 5,067,384 to Scala that describe how to make a cable equipped with a braid in which a series of filaments are free to be oriented in the current and reduce induced vibrations and aerodynamic resistance.

SUMMARY

From the power generation tests through the generator disclosed in the above patents, the Applicant has discovered that it is not necessary to completely re-wind the ropes at the end of the positive phase of every working cycle, taking every time back the kite next to the ground, but that instead it is highly desirable to repeat working cycles at high altitude, between an intermediate height and the maximum height that can be reached, therefore only partially rewinding the ropes before starting a new cycle: by applying this strategy, it is therefore clear that only a sector of the ropes with limited length is subjected to a high number of repeated flexure cycles with great load in mechanical generator members, while another rope sector is wound or unwound on winches only during the limited takeoff and landing phases.

Therefore, object of the present invention is solving the above prior art problems by providing a rope for a tropospheric aeolian generator composed of at least two sectors with different length and construction, optimised for one or more specific functions and with a soft transition between the various sectors.

Another object of the present invention is providing a rope for a tropospheric aeolian generator composed of at least two sectors in which the rope sector nearest to the generator, subjected to repeated flexure cycles inside the system for transmitting and converting the mechanical power into electric power, is structured in order to guarantee a long cyclic fatigue life.

Another object of the present invention is providing a rope for a tropospheric aeolian generator composed of at least two sectors in which the rope sector nearest to the wing or the kite, that can be defined as aerial part of the rope, is structured and profiles in order to provide a low aerodynamic resistance and a minimum weight.

The above and other objects and advantage of the invention, as will appear from the following description, are reached with a rope for a tropospheric Aeolian generator as disclosed herein.

The present invention is better described below with reference to the following non-limiting examples and drawings.

BRIEF DESCRIPTION OF THE DRAWINGS

FIG. 4b is a sectional view of the rope of FIG. 4a;

DETAILED DESCRIPTION

Figure 1:
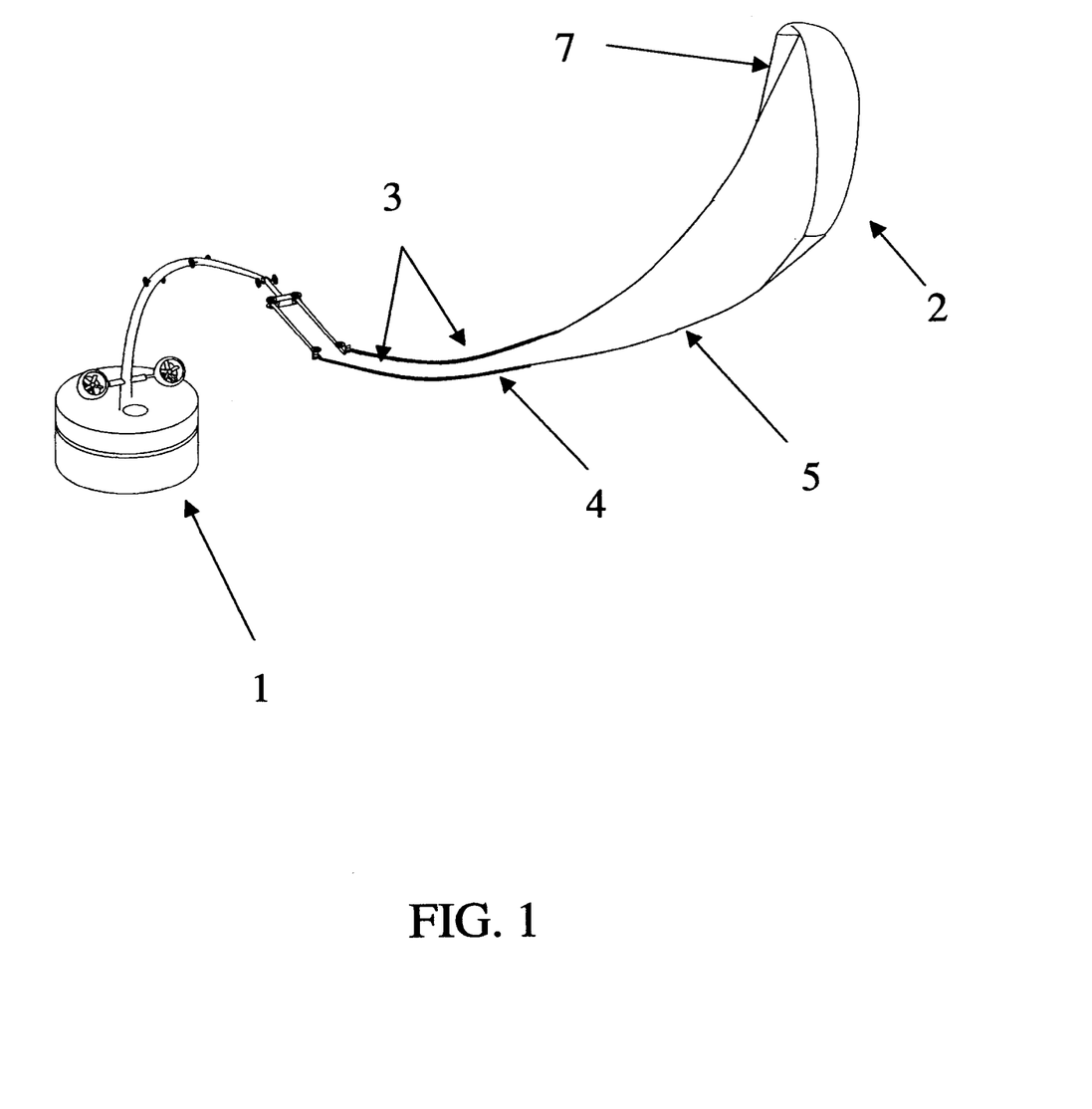
FIG. 1 shows a perspective view of a tropospheric aeolian generator equipped with a preferred embodiment of the rope according to the present invention.
Figure 2:
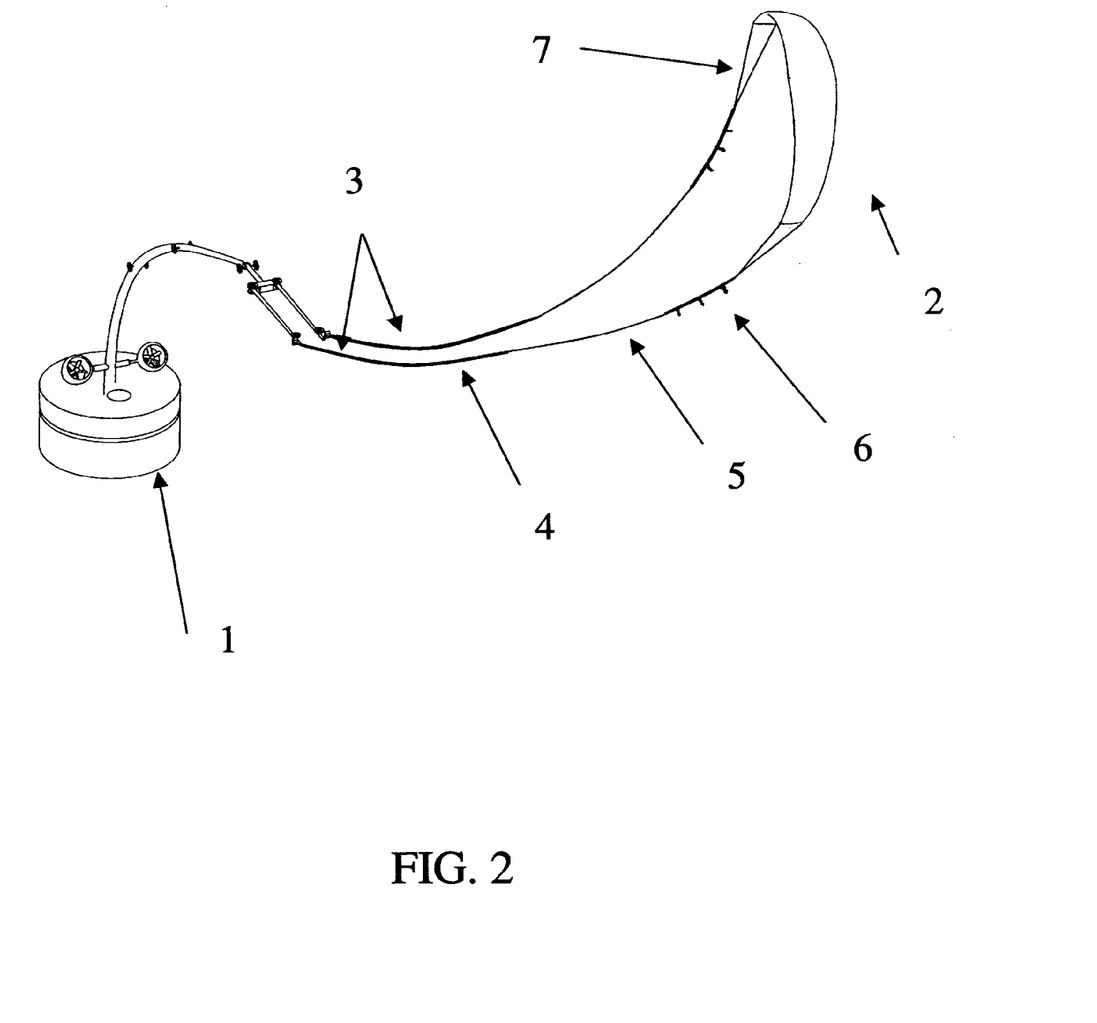
FIG. 2 shows a perspective view of a tropospheric aeolian generator equipped with another preferred embodiment of the rope according to the present invention.
Figure 3:
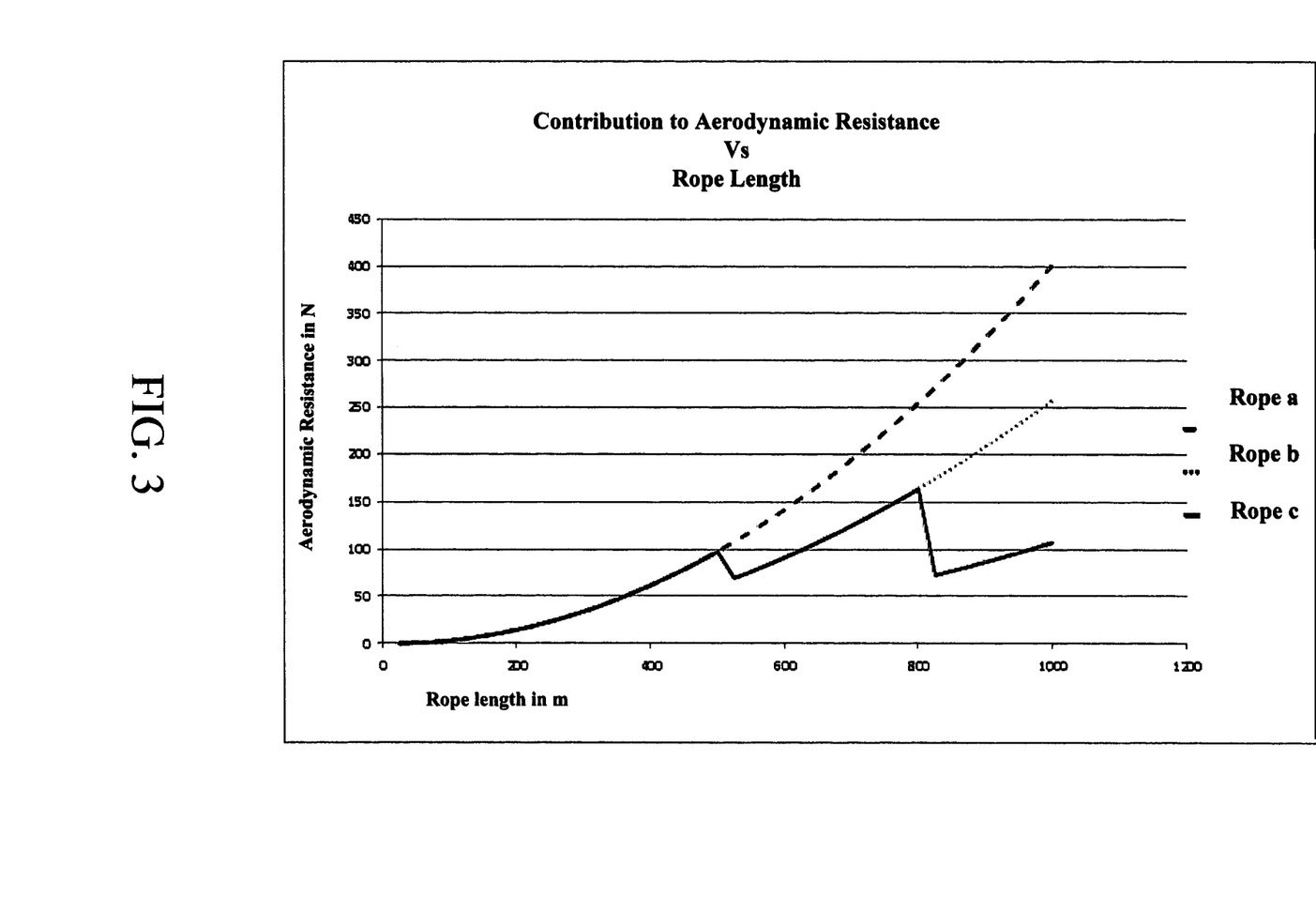
FIG. 3 is a diagram that shows the performance of a rope according to the present invention with respect to prior art ropes.

With reference to FIG. 1, it is possible to schematically note a tropospheric aeolian generator 1 in the configuration 3 with two ropes according to the present invention, such ropes being able to reach lengths on the order of tens of thousands of meters for controlling and transmitting mechanical energy from a kite 2 to the generator 1: in particular, the rope 3 according to the present invention for a tropospheric aeolian generator 1 is composed, in length, of:

at least one first sector 4 optimised to resist to repeated flexure cycles, preferably made with a mixture of synthetic fibres with high elastic modulus and sized by adopting a safety coefficient S1, namely the ratio between the static ultimate tensile strength of the rope and the maximum load provided when operating, included between 3 and 15 and having a diameter D(b1), typically included between 6 mm and 72 mm, preferably between 8 mm and 48 mm and aerodynamic resistance coefficient $C_{D1}$;

at least one second sector 5 optimised to resist to repeated traction cycles with great load, preferably made with a mixture of synthetic fibres with high elastic modulus and sized by adopting a safety coefficient S2<S1 so that the diameter D(b2) of the second sector 5 is shorter than the diameter D(b1) of the first sector 4. In particular, the second sector 5 has a circular section and is optimised to reduce the aerodynamic resistance and/or coated with a coating with low friction coefficient in order to allow the relative sliding of the ropes in case of mutual entanglement.

In particular, the first and the second sector respectively 4 and 5 are terminated at their own ends and mutually joined with one or more junction elements made of metallic or composite material, or joined through a plumbing or, preferably, performing a soft transition and sectors 4,5 during the same or performing a continuous between the various construction process progressive variation.

Preferably, such synthetic fibres are HMPE fibres. In fact, a major feature of the ropes manufactured with HMPE fibres, for example using the fibres marketed with Dyneema® and Spectra® trademarks, is the great capability of resisting to simple traction cycles performed at a high percentage of the ultimate tensile strength.

Preferably, each rope 3 according to the present invention is connected to the kite 2 by means of at least one pair of bridles 7, a front bridle and a rear bridle, respectively made of materials having a different modulus of elasticity, that therefore have a different elongation under the same load, making it possible to make the angle of balance of the kite 2 change depending on the load acting on the kite 2 itself.

When experimenting, the Applicant in fact has discovered that a fixed regulation of the length of the four bridles 7, respectively two front bridles and two rear bridles, determines, in a not adjustable way, the angle of balance of the kite 2 with respect to air, representing a limitation to an easy kite takeoff or to the power that can be generated during operation.

During the takeoff phase, when loads acting on the kite 2 are small, the bridles 7 instead made according to the present invention have such a length as to guarantee for the kite an attitude adapted for takeoff, for example a value of the angle of balance α=α1.

During the flight phases, when loads acting on the kite 2 instead are very high, it is possible to make a pair of bridles 7, for example the two front bridles, respectively front right bridle and front left bridle, be subjected to an elongation under load that is greater then the elongation of the rear bridles, respectively rear right bridle and rear left bridle, conferring to the kite a more pulled-up attitude with respect to the takeoff attitude, with angle of balance α=α2>α1.

A similar reasoning can be followed if an attitude of the kite 2 is desired which is more pushed-down during the flight phases with respect to the takeoff attitude, making the rear bridles elongate under load more than the front bridles.

The elongation related to the bridles can be computed when designing, in order to manage to impose the desired flight attitude depending on the kite load and therefore, due to the relationship existing between load and flight speed, depending on the flight speed.

Assuming that the sector 5 of the rope, that could be defined as "aerial", is subjected only to traction cycles and that instead it is not subjected to repeated flexure cycles on pulleys and winches, it can be devised to exploit the optimum traction resistance features of fibres such as HMPE reducing the safety coefficient to values nearer to unity.

By concentrating the attention to the case in which two ropes are used, a reduced un safety coefficient equal to S2=1.5 could be adopted only for the aerial sector 5 and consequently a reduced diameter equal to D(b2)=9 mm, corresponding to an ultimate tensile strength equal to 77.8 kN globally for 155.6 kN.

The adoption of a reduced safety coefficient allows reducing the diameter of the second sector 5 of the aerial part of the rope 3 according to the present invention without impairing the length and safety of the rope as a whole.

The ratio between safety coefficient of the second aerial sector 5 of the rope 3 and safety coefficient of the first sector 4 of the rope 3 subjected to repeated flexure cycles can obviously be defined and optimised when designing, so that the fatigue life of both rope sectors, subjected to different stresses, coincides.

With reference again to the numeric values of the previous example, a first great advantage linked to the adoption of the rope 3 of the present invention is the chance of using two ropes 3 having a diameter of the second sector 5 equal to D(b2)=9 mm in place of a single traditional rope having a constant diameter equal to D(a) 18 mm, without any aerodynamic penalty, but with a great advantage in terms of reliability and safety.

In fact, by assuming a rope composed of a first sector subjected to repeated flexure cycles having diameter D (b1)=14 mm and length 500 m, and a second sector 5 having diameter D(b2)=9 mm and length 500 m, the global rope resistance, computed for a kite 2 speed of V=40 m/s and linear speed variation between 0 and 40 m/s, is reduced to only 3772 N, therefore in case of two ropes a global resistance equal to 7544 N.

The advantage of the solution proposed as an example consists in reducing the global resistance to about 31% with respect to the above solution A through ropes belonging to the prior art.

This occurs since the biggest contribution to the global aerodynamic resistance derives from the second sector 5 of the rope 3 that moves more quickly with respect to air, therefore from the part nearest to the kite 2.

It is instead amply tolerable to adopt big diameters that guarantee a long fatigue life for the first sector 4 of the rope 3 that moves more slowly, therefore next to the generator 1.

A second great advantage, linked to the strategy providing the repetition of working cycles at high altitudes, consists in the chance of improving the aerodynamic features of the aerial part of the rope with solutions that a complete and repeated winding of the rope would preclude. In fact, during the kite takeoff and landing phases, procedures can be tolerated that provide for reduced winch rotation speeds and rope tensions, automated systems for guiding the ropes, connecting and disconnecting systems for aerodynamic bodies.

During the generation phase, the control system instead must be able to have available all mechanical potentialities of the generator in terms of maximum rope tension and rotation speed; therefore the capability of maneuvering the rope sector subjected to a repeated flexure of mechanical members becomes fundamental.

A first improvement, having a big impact on performances of the tropospheric aeolian generator 1, can be obtained by adopting, only for the second sector 5 of the aerial part of the rope 3 with reduced diameter, suitable solutions similar to those successfully used in other fields, but adapted to the operating requirements of the generator to reduce the aerodynamic resistance coefficient.

It is for example possible to cover only the second sector 5 of the rope 3 with an extremely smooth sheath or coating made of plastic material to reduce the surface roughness and take the $C_D$ to values next to those of a smooth cylinder ($C_D$=1,2).

It is also possible to cover only the second sector 5 of the rope 3 with a sheath or coating made of plastic material equipped with a distribution of recesses and ridges in order to anticipate the turbulent transition of the limit layer and reduce the aerodynamic resistance coefficient.

A further solution consists in covering only the second sector 5 of the rope 3 with a sheath equipped on its surface with at least one helical profile with a suitable pitch, in order to reduce the effect of the detachment of the slipstream vortexes, prevent the occurrence of vibrations induced by vortexes and reduce the aerodynamic resistance coefficient.

A further solution consists in covering only the second sector 5 of the rope 3 with a protecting braid equipped with filaments that are free to be oriented along the flow lines in order to anticipate the turbulent transition of the limit layer and reduce the aerodynamic resistance coefficient.

A further solution consists in winding only around the second sector 5 of the rope 3 bands of fabric or of plastic material that are free to be oriented along the flow lines in order to anticipate the turbulent transition of the limit layer and reduce the aerodynamic resistance coefficient.

A further solution finally consists in providing only the aerial part of the rope with a sheath made of plastic material that is aerodynamically profiled.

Figure 4A:
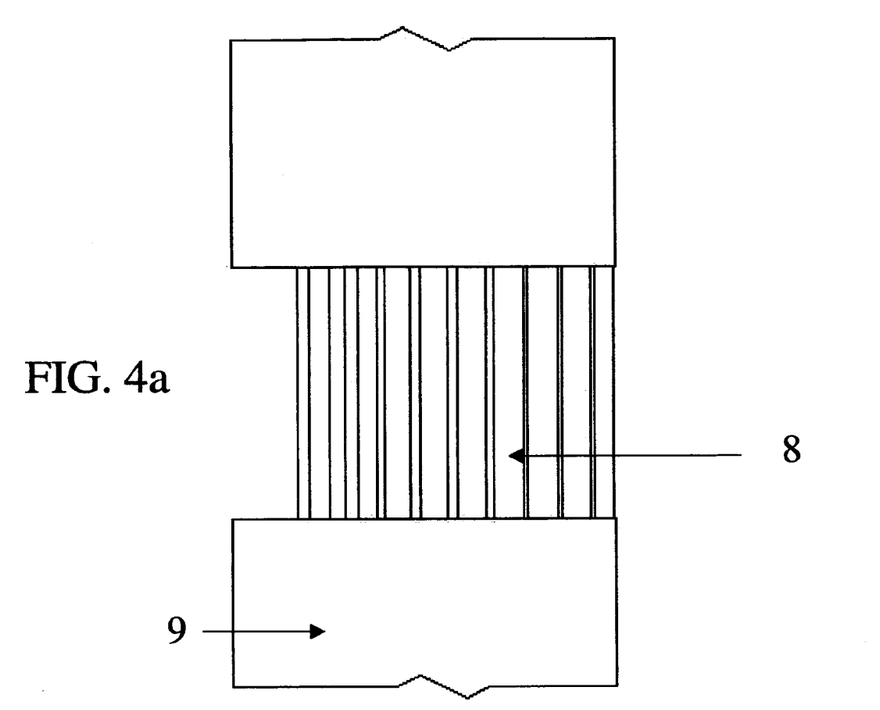
FIG. 4a is a side view of another preferred embodiment of the rope according to the present invention.
Figure 4B:
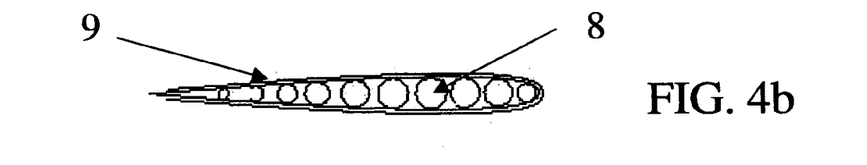

A completely new solution instead consists in manufacturing only the second sector 5 of the rope 3, usually circular, in order to assign it an elongated section, with a ratio between loner axis and shorter axis ranging between 1.5 and 5. This is technically possible, though the resulting section has not yet the desired aerodynamic features. An improvement of the aerodynamic features can be obtained by winding the rope 3 manufactured with an elongated section with a braid and filling the recesses with low-density material in order to obtain an elliptical section. Alternatively, it is possible to extrude along the rope 3, manufactured with an elongated section, a sheath made of plastic material and flexible, in order to obtain an elliptical section. A further great improvement with respect to this solution however consists in using, in place of the single rope 3, two or more ropes with different diameter that are mutually placed in parallel, so that the sum of the resisting sections of the single ropes 3 is equal to the resisting section adapted to support the mechanical stresses provided when designing. By suitably filling the recesses between the ropes 3 with different diameter with low-density material, it is possible to assign a wing-shaped profile to the section, in which the rope 3 with greater diameter will occupy the area with maximum thickness (FIG. 4b). The multiple rope 8 profiled in this way, as shown for example in FIGS. 4a, 4b and 5, can be coated with a woven protecting braid suitable to take part in the global mechanical resistance.

Figure 5:
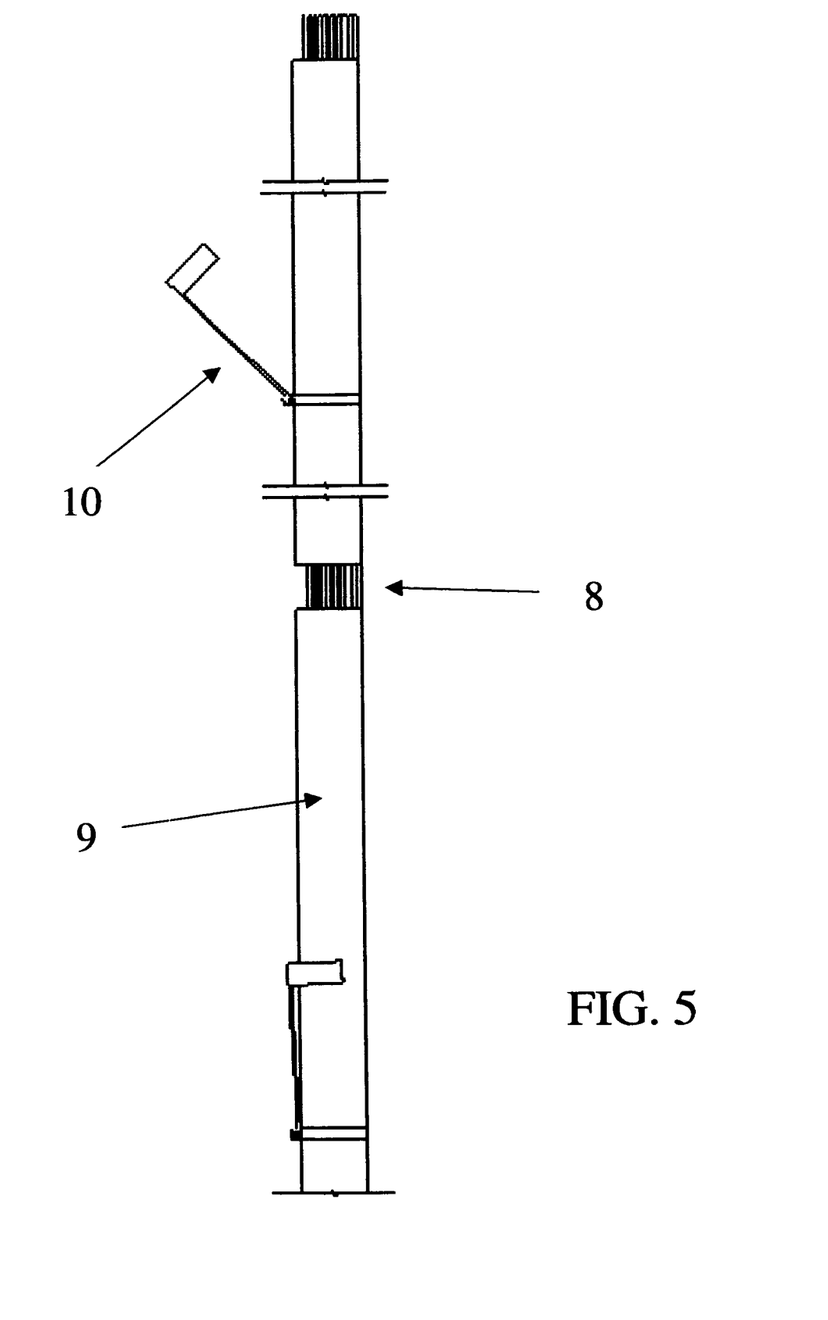
FIG. 5 is a side view of another preferred embodiment of the rope according to the present invention.

Alternatively, the multiple rope 8 profiled in this way can be covered with a flexible sheath made of plastic material in order to reduce its surface roughness to a minimum.

Alternatively, the rope itself can be woven in order to obtain an aerodynamic section.

Alternatively, the rope can be woven according to traditional methodologies, then annealed into a plastic or elastomeric material and deformed under pressure in order to obtain an aerodynamic section.

The possible protecting braid made of fabric or the possible sheath made of plastic material can be interrupted at regular intervals (such as shown, for example, in FIG. 5), leaving the single rope or the set of multiple ropes composing the global rope, free of flexing, in order to increase the flexibility of the aerial part of the rope and facilitate the re-winding on the winch drums.

Moreover, taking into account the different flight speeds to which different areas of the aerial part of the profiled rope move with respect to air, the chosen wing profile can have different geometric, and therefore aerodynamic, features in different areas of the aerial part of the rope.

Profiling the rope according to shapes that are different from the circular section, however, implies the occurrence of instability phenomena similarly to what occurs for aircraft wings. In fact, we know that the elliptical profiles and the symmetric wing profiles are unstable, namely a positive variation of the incidence angle generates an aerodynamic moment that tends to further increase the incidence angle, till the profile is oriented orthogonal to the current. This behaviour can obviously induce separations of the slipstream, resistance increase and aero-elastic instability of the rope as a whole.

For this reason, with particular reference to FIGS. 2, 4a, 4b, 5, 6 and 7, another preferred embodiment of the rope 3 according to the present invention can comprise a second sector 5 equipped with real tail planes, similarly to those used by aircrafts, that are able to balance the aerodynamic moment generated by incidence variations on the rope and guarantee a stable behaviour. With reference therefore in particular to FIG. 2, it is possible to note that another preferred embodiment of the rope 3 according to the present invention for a tropospheric aeolian generator 1 is further composed, in length, of at least one third sector 6, such third sector 6 being equipped with a profiled section 9 such that its own transverse section has an aerodynamic resistance coefficient $C_{D3}$ preferably included between 1.2 and 0.05, still more preferably between 0.6 and 0.05 so that $C_{D3}<C_{D1}$; moreover, such third sector 6 can be equipped with stabilising tail planes 10 in such a number and placed at such mutual distance as to guarantee the global rope stability.

Figure 6:
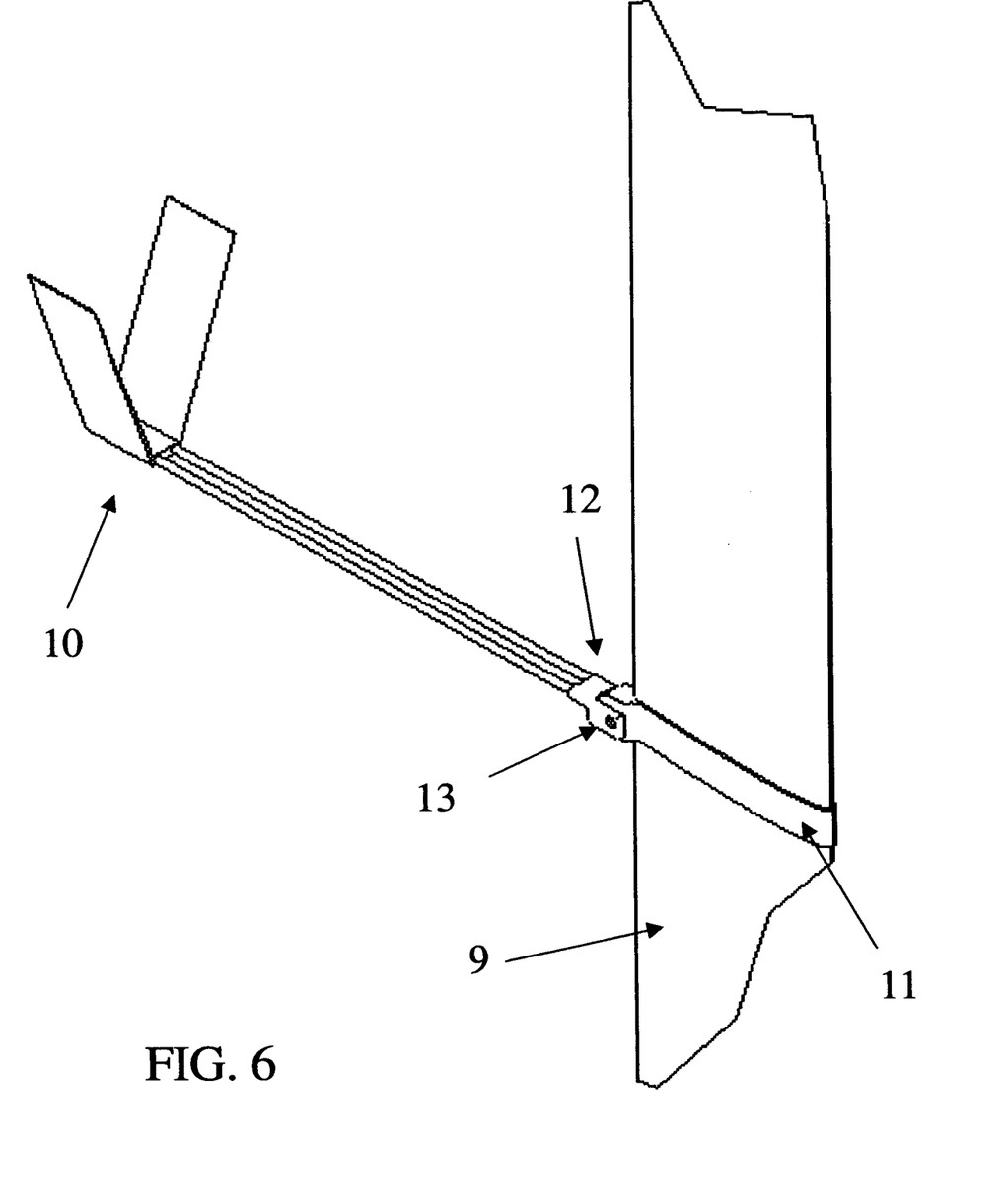
FIG. 6 is a detailed view of the rope of FIG. 5.
Figure 7:
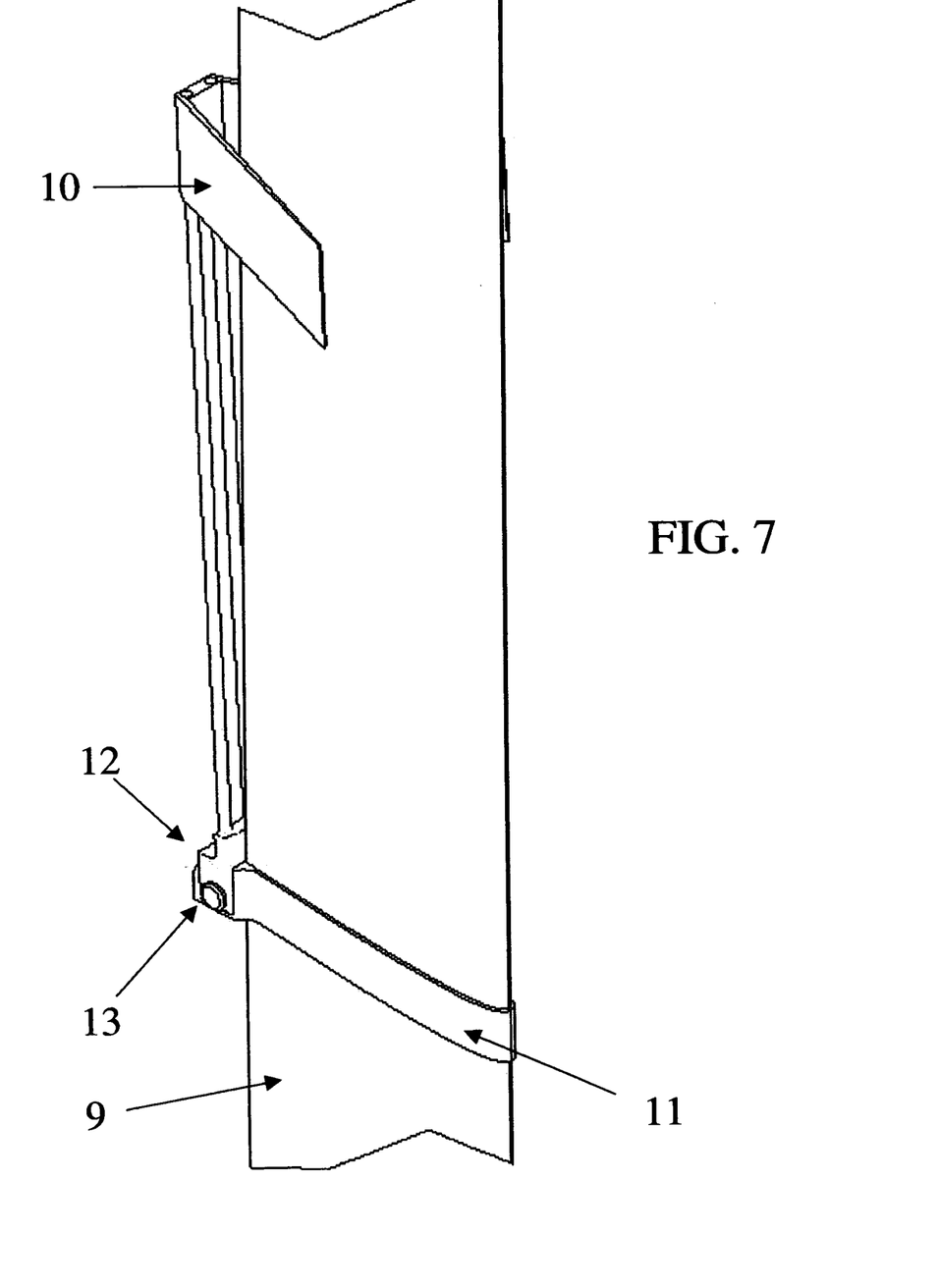
FIG. 7 is another detailed view of the rope of FIG. 5.

With reference to FIGS. 5 and 6, the tail planes 10 are preferably constrained to the third sector 6 of the rope 3 through at least one hinge 12 and one pin 13 that, allowing the rotation of the tail planes 10 around an orthogonal axis to the axis of the rope 3, guarantee an ordered rewinding of the third sector 6 of the rope 3 including the tail planes 10 on the collecting drum of the rope 3 during the landing procedure. Preferably, the hinge 12 is constrained to the profiled section 9 through at least one strap 11. As shown in FIG. 7, the tail planes 10 can rotate around the axis of the hinge 12 in order to be re-bent towards the rope 3.

The number and the mutual position of the tail planes 10 will obviously depend on the aerodynamic features of the rope 3 and the maximum speed of the rope 3 with respect to air, choosing the solution that guarantees the stability of the rope 3 under all operating conditions and the minimum additional aerodynamic resistance due to the tail planes 10.

The tail planes 10 can be finally constrained to the aerial part of the rope, or can be fastened to the cable automatically with a clip-type mechanism upon starting up the generator and slowly unwinding the aerial part of the rope; similarly, they can be disconnected when rewinding the aerial part of the cable and stopping the generator.

If the tail planes 10 are finally constrained to the aerial part of the rope, they must be able to be wound onto the collecting winches integrally with the rope during the limited takeoff and landing phases.

It has been found that, by constraining the tail planes on the hinge 12 next to the escape edge of the aerodynamically profiled section 9, it is possible to make the tail planes 10 bend next to the winch drums and be orderly arranged on the collecting drum.

It is clear that the tail planes 10 can be more easily wound on the last, more peripheral, rope layer wound on the collecting drum.

In order to guarantee the correct orientation of the tail planes 10 during the flight phases, it has been found that a spring, for example a torsion spring, placed next to the hinge 12 and with enough stiffness as to keep in position the tail planes 10 in spite of the action of the aerodynamic forces, can efficiently solve this technical problem.

As already stated, the innovations brought about by the present invention can be profitably used by any tropospheric or high-altitude aeolian generator.

In particular however, if the solution 3 with two ropes 3 is used to transmit the mechanical energy to the ground, as in case of the generator described in the above patents of the Applicant, it is necessary to take into account and guarantee the chance that the ropes can get entangled during the flight and generating phases. When experimenting a prototype of such generator, the behaviour of wings and control system has been widely tested when the ropes get mutually entangled.

It has been demonstrated that the system can regularly operate also with many mutual windings of the ropes, since the wing control is linked to the different length of the ropes and to the different tension values in the ropes.

The ropes with circular section are however free to slide one with respect to the other even when they get entangled, and moreover the number of mutual windings does not reduce the efficiency of the flight control system.

It is also clear that the mutual sliding freedom of the ropes would be limited by the profiled section and impaired or even prevented by the presence of the tail planes.

When experimenting, it has also been verified that the cable entanglement occurs starting from the centre-distance of the flying part of the rope and, upon increasing the windings, extends along the flying wing direction and the ground generator direction.

For this reason, it has been found that the aerial part of the rope, in a preferred embodiment, can in turn be divided into two sectors, for three sectors globally.

By moving along the completely unwound rope starting from the generator along the wing direction, therefore in this case there are a first sector subjected to repeated flexure cycles, a second sector equipped with a circular section and able to tolerate the mutual rope entanglements, and a third sector that is aerodynamically profiled and equipped with tail planes.

In particular, the sector of the aerial part of the rope equipped with circular section can be covered with a braid, a sheath or a surface coating with low surface friction, in order to facilitate the mutual sliding of the ropes next to the areas where mutual windings can be generated.

The sheath or coating can also be advantageously equipped with surface recesses in order to anticipate the turbulent transition and reduce the aerodynamic resistance coefficient.

Going back to the previous numeric example, it is possible to manufacture a rope 3 according to a preferred embodiment in which a rope is composed of a first sector 4 having diameter $D(b1)=14$ mm, length 500 m, $C_D=1.2$, a second sector 5 having diameter $D(b2)=9$ mm, length 300 m and $C_D=1.2$, a third sector 6 having diameter $D(b3)=9$ mm, length 200 m and a reduced aerodynamic resistance coefficient $C_D=0.5$ that has a global resistance equal to 2768 N.

Finally, the rope for a tropospheric aeolian generator of the present invention is composed of at least two sectors with different length and construction features. The rope sector nearest to the generator, subjected to repeated flexure cycles inside the system for transmitting and converting mechanical power into electric power, is structured in order to guarantee a long cyclic fatigue life.

The rope sector nearest to the wing or kite, that can be defined as aerial part of the rope, is structured and profiled in order to provide low aerodynamic resistance and minimum weight.

The passage between contiguous rope sectors is performed in order to guarantee a soft transition.

A further advantage deriving from a rope 3 according to the present invention is that, in case of breakage of one of the ropes, the piece of rope softly glides instead of falling to the ground, and therefore the automatic control system has enough time to quickly rewind the damaged rope before it reaches the ground.

The invention claimed is:

1. A rope for a tropospheric aeolian generator, the rope comprising in length:
at least one first sector adapted to resist to repeated flexure cycles, the first sector having a first safety coefficient that is the ratio between static ultimate tensile strength of the rope and maximum load applied when operating the rope of between 3 and 15 and having a first diameter between 6 mm and 72 mm and a first aerodynamic resistance coefficient;
at least one second sector adapted to resist to repeated traction cycles under load, the second sector having second aerodynamic resistance coefficient and a second safety coefficient less than the first safety coefficient and a second diameter less than the first diameter,
wherein the first and second sectors are joined to form a continuous and progressive variation between the sectors, the first and second sectors being terminated at their own ends and mutually joined with one or more junction elements made of metallic or composite material.

2. The rope of claim 1, wherein the rope further comprises in length, at least one third sector, the third sector having a profiled section having a transverse section having a third aerodynamic resistance coefficient less than the first aerodynamic resistance coefficient.

3. The rope of claim 2, wherein the third aerodynamic resistance coefficient is between 1.2 and 0.05.

4. The rope of claim 3 wherein the third aerodynamic resistance coefficient is between 0.6 and 0.05.

5. The rope of claim 2, wherein the first, second and third sectors are joined to make a continuous and progressive variation between sectors, the first, second and third sectors being terminated at their own ends and mutually joined with one or more junction elements composed of metallic or composite material.

6. The rope of claim 1, wherein the rope is adapted for connection to a kite through at least one pair of bridles made with materials having a different modulus of elasticity.

7. The rope of claim 2, wherein the third sector comprises stabilising tail planes.

8. The rope of claim 7, wherein the tail planes are joined to the third sector through at least one hinge and one pin adapted to allow a rotation of the tail planes around an axis orthogonal to an axis of the rope.

9. The rope of claim 8, wherein the hinge is joined to the profiled section through at least one strap.

10. The rope of claim 8, wherein the hinge comprises at least one spring adapted to keep the tail planes in position.

11. The rope of claim 1, wherein the first sector and the second sector each comprise a mixture of synthetic fibres.

12. The rope of claim 11, wherein the synthetic fibres are HMPE fibres.

13. The rope of claim 1, wherein the second sector has a circular section and is coated with a coating having a low friction coefficient.

14. The rope of claim 1, wherein the second sector is covered with an aerodynamically profiled sheath plastic material.

15. The rope of claim 1, wherein the second sector is covered with a sheath or coating comprising a plastic material having a distribution of recesses and ridges adapted to anticipate turbulent transition of the limit layer and to reduce the second aerodynamic resistance coefficient of the second sector.

16. The rope of claim 15, wherein the sheath is interrupted at regular intervals to leave the rope free of being flexed.

17. The rope of claim 1, wherein the second sector is covered with a sheath having a surface having at least one helical profile, or a surface covered with a protecting braid having filaments oriented along flow lines.

18. The rope of claim 17, wherein the sheath is interrupted at regular intervals to leave the rope free of being flexed.

19. The rope of claim 1, wherein the second sector is wound with bands of fabric or plastic material oriented along flow lines.

20. The rope claim 1, wherein the second sector is covered with an aerodynamically profiled sheath comprising a plastic material.

21. The rope of claim 1, wherein the second sector has an elongated sectional shape having a ratio between longer axis and shorter axis of 1.5 to 5.

22. A multiple rope comprising a plurality of individual ropes according to claim 1 wherein the individual ropes are in parallel.

23. The multiple rope of claim 22 wherein recesses between the individual ropes comprise a low-density material for use in a sectional wing profile wherein one of the individual ropes has a greater diameter and occupies an area of maximum thickness of the wing profile.

24. The multiple rope of claim 22, wherein the multiple rope is covered by any of a protecting braid, or a flexible sheath comprising a plastic material.

* * * * *